(No Model.)

C. C. LOCKSTAEDT & J. F. GUBBINS.
FILTER.

No. 483,230. Patented Sept. 27, 1892.

Witnesses:
Otto Luebkert
Rudolph Lotz

Inventors
Chas. C. Lockstaedt
John F. Gubbins
By Lotz & Kennedy,
their attorneys.

UNITED STATES PATENT OFFICE.

CHARLES C. LOCKSTAEDT AND JOHN F. GUBBINS, OF CHICAGO, ILLINOIS.

FILTER.

SPECIFICATION forming part of Letters Patent No. 483,230, dated September 27, 1892.

Application filed August 15, 1891. Serial No. 402,776. (No model.)

*To all whom it may concern:*

Be it known that we, CHARLES C. LOCKSTAEDT, a subject of the Emperor of Germany, and JOHN F. GUBBINS, a citizen of the United States, residing at Chicago, in the county of Cook and State of Illinois, have invented certain new and useful Improvements in Filters; and we do hereby declare the following to be a full, clear, and exact description of the invention, such as will enable others skilled in the art to which it appertains to make and use the same.

This invention relates to a novel construction in filters, and relates more especially to a filter that is designed for household use and arranged for attachment to a water-pipe in place of a faucet.

The objects of our invention are to provide a filter that can be readily attached to a water-pipe, and in the use of which the water can be drawn with or without being filtered, and to provide a filter of simple, durable, and inexpensive construction.

The invention consists in the features of construction and combination of parts hereinafter fully described, and specifically claimed.

Figure 1:
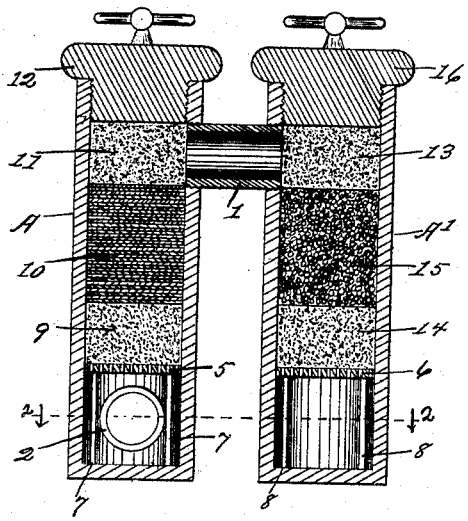
Figure 2:
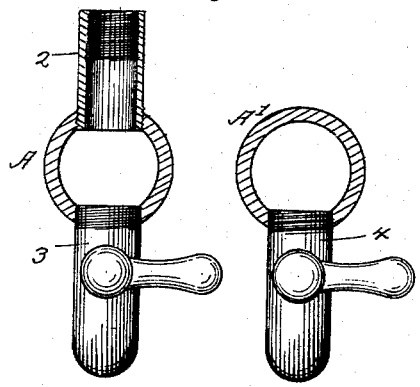

In the accompanying drawings, illustrating our invention and making a part of this specification, Figure 1 is a vertical sectional view of a filter constructed in accordance with our invention; and Fig. 2 is a horizontal cross-section, partly on the line 2 2 of Fig. 1, with certain parts in plan and the legs of the filtering-plate omitted.

Referring now to said drawings, A and A' indicate the filter-casings, consisting of hollow cylindric shells having closed lower ends and open upper ends. The said casings communicate with each other near their upper ends conveniently by means of a pipe or passage 1. Near its lower end said casing A is provided with supply-port consisting of a short pipe 2, by means of which it can be connected with a pipe for supplying water. Said casing A is also provided with an outlet port or spigot 3 for unfiltered water, located near its lower end and about opposite the pipe 2, and the casing A' is provided with an outlet port or spigot 4 for filtered water near its lower end. An open water-space is provided at the lower end of each of the said casings by the perforated filtering-plates 5 and 6, located within the lower end portions of the casing and supported by means of legs 7 and 8, fastened to the lower faces of said plates 5 and 6.

Upon the filtering-plate 5 in the casing A a layer 9 of felt or analogous material is placed. Upon the felt layer 9 a plurality of layers 10 of filtering-paper or like substance is placed, the upper surface of which is about on a level with the passage 1 between the casings. Upon the filtering-paper another layer 11 of felt is placed, which extends above the passage 1. The upper end of the casing is interiorly screw-threaded, and a screw-threaded cover 12 screws into the end of the casing and down upon the top layer 11 of felt. The casing A' is provided in a like manner with top and bottom layers of felt 13 and 14; but instead of the filtering-paper a mass of charcoal 15 is interposed between such layers of felt 13 and 14, and a cover 16 screws into the upper end of the casing A', as shown.

It will be seen that the filter comprises few parts and can be made at a small cost, and, further, that any of the parts can be readily removed and easily replaced with little trouble.

In operation the filter is secured to the water-pipe in place of the ordinary faucet by means of the short pipe 2. When filtered water is desired, the spigot 4 is opened and the spigot 3 closed. The water from the water-supply pipe will then pass up through the filtering-plate and material in the casing A, through 1 to casing A', and down through the filtering material and plate in casing A' and out the spigot 4. When it is desired to use the water without being filtered, the spigot 3 is opened and the spigot 4 closed. The water will then pass directly from the water-supply pipe to the spigot 3 in an obvious manner. It will be noted that when the water is being filtered a large part of the impurities and foreign matters therein are stopped by perforated plate 5 and collect about the lower face of the same; but this accumulation is cleaned off and removed by the water as it passes out directly through the spigot 3.

We claim as our invention—

1. A filter comprising two casings, each having water-chambers at one end thereof, a supply and outlet port communicating with one of said water-chambers and an outlet-port communicating with the other water-chamber, a pipe or passage between the casings at the opposite ends thereof, a mass of filtering material located within and filling up the remaining portions of said casings and located over and covering the ends of said pipe or passage connecting said casings, and covers located within said ends of the casings and bearing upon said filtering material.

2. A filter comprising a casing A, having supply and outlet ports 2 and 3 near its closed end, a perforated plate 5, located between said ports 2 and 3 and the other end of the casing, filtering material located upon said perforated plate, a cover 12, secured in the open end of the casing A and bearing upon said filtering material, a casing A', having an outlet-port 4 near its closed end, a perforated plate 6, located between said port and the other end of said casing A', filtering material located upon said perforated plate 6, a cover 16, secured in the open end of the casing A' and bearing upon said filtering material, and a communication between said casings near the ends within which the covers are located.

In testimony whereof we affix our signatures in presence of two witnesses.

CHAS. C. LOCKSTAEDT.
JOHN F. GUBBINS.

Witnesses:
RUDOLP W. LOTZ,
OTTO LUEBKERT.